United States Patent [19]

Martin

[11] 4,012,662
[45] Mar. 15, 1977

[54] COMMUNICATION SYSTEM BETWEEN A TRANSMITTER, RECEIVER STATION AND A MOBILE STATION UTILIZING UNIDIRECTIONAL AMPLIFIERS BETWEEN PARALLEL RADIATED TRANSMISSION LINES

[75] Inventor: David James Reginald Martin, Leatherhead, England

[73] Assignee: Coal Industry (Patents) Limited, London, England

[22] Filed: Feb. 13, 1976

[21] Appl. No.: 657,879

[30] Foreign Application Priority Data

Mar. 7, 1975 United Kingdom ............ 09567/75

[52] U.S. Cl. .................................. 325/28; 325/51
[51] Int. Cl.² .......................................... H04B 3/00
[58] Field of Search ............... 325/1, 4, 23, 28, 51, 325/53; 179/82; 333/4, 5, 84 L, 95 S, 97 R; 246/8, 63 C; 178/71 N

[56] References Cited

UNITED STATES PATENTS

| 3,585,505 | 6/1971 | Ogilvy | 325/51 |
| 3,588,372 | 6/1971 | Jauquet | 179/82 |
| 3,629,707 | 12/1971 | Baba | 325/53 |
| 3,896,380 | 7/1975 | Martin | 325/28 |

Primary Examiner—Robert L. Griffin
Assistant Examiner—Jin F. Ng
Attorney, Agent, or Firm—James C. Wray

[57] ABSTRACT

A leaky feeder radio transmission system uses twin feeders connected respectively to a transmitter and receiver at a base station. The feeders are connected at intervals by uni-directional amplifiers which, alternately along the lines, are connected for conduction in opposite directions. Filters are positioned in the line between amplifier connection points. A mobile station adjacent to the feeders receives signals at one frequency from the feeders and transmits signals at a second frequency.

5 Claims, 1 Drawing Figure

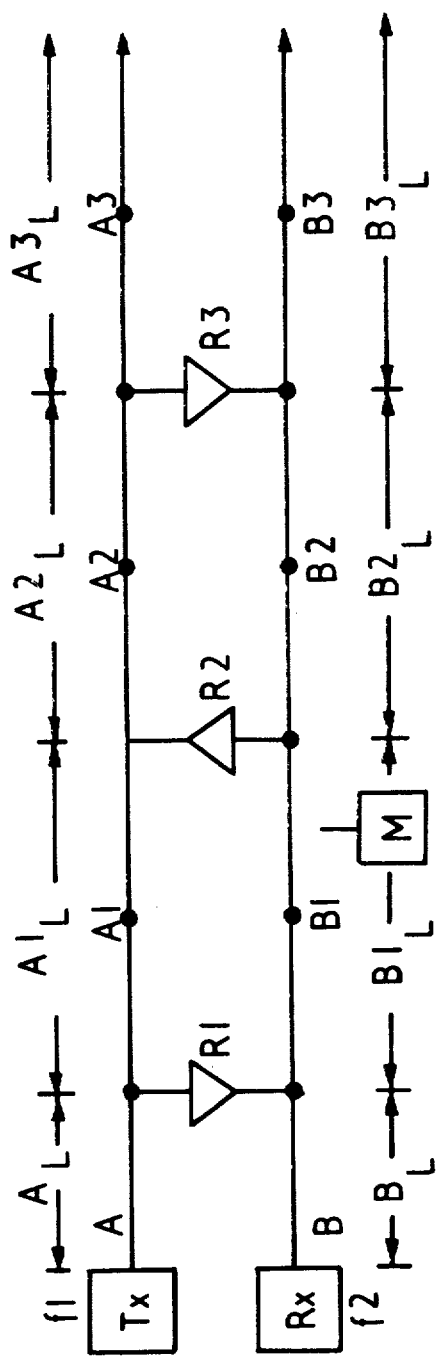

COMMUNICATION SYSTEM BETWEEN A TRANSMITTER, RECEIVER STATION AND A MOBILE STATION UTILIZING UNIDIRECTIONAL AMPLIFIERS BETWEEN PARALLEL RADIATED TRANSMISSION LINES

This invention relates to a telecommunication system of the kind in which signals are transmitted from a transmitter base station to a mobile station and signals from the mobile station to a receiver base station through a radiating transmission line.

This type of telecommunication system is widely used for communication purposes in tunnels or mines where ordinary radio communication systems are virtually ineffective due to their inability to propagate signals any significant distance on account of the attenuation effects of the walls of the tunnel. The system relies on a 'leaky feeder' type of radiating transmission line which comprises basically a coaxial cable having an imperfect outer conductor through which electromagnetic fields may propagate into the surrounding space. The leakage is usually achieved by using a loosely wound braid as the outer conductor or by forming the conductor with a slit or holes along its length. A mobile station which is usually a combined transmitter and receiver can, when it is in the vicinity of the line, receive signals from a base station transmitter over the line and send signals back to a base station receiver.

The basic range of such a system is limited by the normal losses within the transmission line or feeder itself, typically to a figure of 2km from the fixed base station. It is further known that such losses may be compensated for periodically by inserting suitable amplifiers or repeaters in series with the feeder. The specification of U.S. Pat. No. 3,916,311 describes how this may be achieved using a very simple type of one-way repeater in an arrangement where the base station is split into its constituent transmitter and receiver located at opposite extremities of the system. The specification of our co-pending U.S. patent application Ser. Nos. 586,280 and 586,245, both filed on June 12, 1975, describe how spurs or additional lengths of feeder may with advantage be connected to the input and output circuits of such one-way repeaters, doubling back in opposite direction to the main signal flow, so as to reduce the variation in coupling normally experienced between the feeder and a mobile set according to its situation with respect to the nearest repeater; such a modified system may conveniently utilise a form of feeder which itself comprises a pair of coaxial transmission lines or feeders spaced closely parallel. It is a remaining disadvantage of such systems that the direction of signal flow within the system is one-way, necessitating the installation of substantial fixed equipment, that is either a transmitter or a receiver, at each extremity of the system. Thus, it is not possible to provide the system with branches of spurs for the purpose of serving branch tunnels, where such spurs or branches are of such length as to necessitate the inclusion of further repeaters, without similarly providing a substantial piece of terminal equipment in the form of a further transmitter or receiver at the extremity of the spur or branch. It is also a disadvantage in all such one-way systems, whether spurs be taken or not, that the equipment at all extremities must normally be connected together by means additional to the feeder itself, such as by a pair of telephone lines.

It is an object of the present invention to provide a telecommunication system of the kind referred to which, while still using simple one-way repeaters, enables the direction of main signal flow in the feeder system to be made two-way so that one extremity of a system only need by associated with the base station and so equipped. It is a further object to provide such a system in which in the case of a branch or spur to a main feeder, all signal paths may be considered as flowing out of or into the main feeder so that additional fixed equipment at the extremity of the spur is likewise not necessary.

According to the present invention a telecommunication system of the kind in which signals can be transmitted from a transmitter base station to a mobile station and signals from the mobile station can be transmitted to a receiver base station through a radiating transmission line, comprises a pair of radiating transmission lines extending substantially parallel to each other, one of the lines being connected to a base transmitter station and the other of the lines being connected to a base receiver station, a plurality of unidirectional amplifier elements connected between the lines at spaced intervals, alternate ones of the amplifier elements being connected to conduct in the opposite direction to adjacent amplifier elements, and routing means connected in the transmission lines between each connection and amplifier element, the routing means being arranged to route signals along the lines alternately whereby a signal is arranged to travel along part of a first of the lines and then through a part of the second of the lines with the transfer between lines being effected through one of the amplifier elements.

The signals from the base transmitter are arranged to be transmitted at a frequency substantially different from the frequency of the signals transmitted by a mobile station. The routing means may thus comprise frequency filters of two types, one type being designed to pass signals of a first frequency from the base transmitter while attenuating signals of a second frequency from the mobile station and the other being arranged to pass signals of the second frequency from the mobile station while attenuating signals of the first frequency from the base transmitter.

Alternatively the routing means may comprise radio-frequency switches, the switches in adjacent parts of the lines being arranged to be opened and closed alternately. The frequency of operation of the switches is preferably above the modulation frequency of the transmitter signals.

Whichever type of routing means is used it should be ensured that the means in opposite sections of the lines in any one part bounded by two unidirectional amplifier elements are never conducting at the same time to a particular frequency. This is to prevent a closed loop situation arising with consequential instability.

In order that the invention may be readily understood one embodiment, and modification thereof, will now be described, by way of example only, with reference to the single FIGURE of the accompanying drawing which shows schematically a circuit layout of a transmission line for use in a tunnel or mine roadway.

Referring now to the drawing, the tunnel or mine roadway to be served with radio communication is equipped with two leaky transmission lines or feeders A and B, constructed from a wire braid coaxial cable and arranged to be substantially parallel and extend along the length of the tunnel or mine roadway. At one end of the system feeder A is connected to the fixed base transmitter station Tx adapted to transmit on frequency $f1$ and feeder B is connected to fixed base receiver station Rx adapted to receive on frequency $f2$. Communication between the base station formed by Tx and Rx and any mobile or personal station such as that shown at M within the mine or tunnel being served takes place through the leakage fields of feeders A and B, the mobile stations M being adapted to receive on frequency $f1$ and transmit on frequency $f2$.

At suitable intervals indicated by the lengths $A_L$, $A1_L$ ... $B_L$, $B1_L$ ... unidirectional repeaters or amplifiers R1, R2, R3, ... are connected between the leaky feeders A and B as shown with alternate directions of connection so that odd-numbered repeaters R1, R3, ... have their input circuits connected to feeder A and their output circuits connected to feeder B, while even-numbered repeaters R2, R4, ... have their input circuits connected to feeder B and their output circuits to feeder A. The amplification of each repeater is arranged to be approximately equal to the loss in a section of one leaky feeder between successive repeaters for all frequencies such $f1$ and $f2$ being used for communication.

The arrangement as so far described has a tendency to be unstable since it includes closed loops round which the net amplification might exceed unity. Additional circuit elements constituting routing means are therefore included in series with both leaky feeders at points A1, A2, A3, ... and B1, B2, B3, ..., such points being advantageously situated approximately half-way between successive repeaters.

The elements introduced at odd-numbered points B1, B3, B5, ... and even-numbered points A2, A4, A6, ... may in one form of the invention comprise radio-frequency filters arranged to pass frequency $f1$ with minimum loss but to attentuate frequency $f2$, while the remaining elements at odd-numbered points A1, A3, A5, ... and even-numbered points B2, B4, B6, ... comprise filters arranged to pass frequency $f2$ with minimum loss but to attenuate frequency $f1$. The signal path through the system from transmitter Tx at frequency $f1$ is then by way of feeder length $A_L$ through repeater R1 to feeder length $B_L$ thence through $B1_L$ and B1, R2, $A2_L$ and A2, R3, $B3_L$ and B3, ..., while the signal path returning to receiver Rx is through $B_L$, R1, $A1_L$ A1, R2, $B2_L$ and B2, R3, $A3_L$ and A3, ... The signal in each direction of transmission thus has a complete and continuous path through the system but there are no closed loops with net amplification sufficient to cause instability.

It will be seen that the system is economical in the use of repeaters since each repeater, although unidirectional, is capable of amplifying the signals passing in both directions of transmission, simultaneously if necessary. Each repeater is of a simple one-way type. It will also be appreciated that the filtering requirements at the points approximately half-way between successive repeaters to maintain stability in the system are considerably less than would be necessary in the design of a suitable two-way repeater to ensure the same margin of stability. In an alternative form of the invention the elements A1, A2, A3, ... B1, B2, B3, ... are arranged to take the form of radio-frequency switches which may be caused to open and close at a high rate of repetition. For part of the total time odd-numbered switches B1, B3, B5, ... and even-numbered switches A2, A4, A6, ... are arranged to close simultaneously, while for other part of the total time the remaining switches A1, A3, A5, ... and B2, B4, B6, ... are arranged to close simultaneously. The two signal paths as previously described for frequencies $f1$ and $f2$ are thus each open for part of the total time, but at no time are there any completely closed loops round which the net amplification might cause instability.

A suitable rate of repetition for the switching operations would be in the range immediately above that of the modulation frequencies being used. For example, where the transmitted radio signals are of speech a suitable frequency would be 8 kHz. All receivers used in the system must be of such a type as to respond to the maximum, or at least the mean, level of signals received during such switching cycle.

The arrangement illustrated in the drawing may represent a branch or spur to a main system, which itself may or may not embody this invention, in which case the transmitter Tx and receiver Rx are to be considered replaced by connections into the main system, with the transmitter and the receiver of the main system then being considered as the transmitter and the receiver base stations of the invention.

Notwithstanding that the description of this invention has been given as applying to a mine or tunnel, it is to be understood that the invention may be applied usefully to any radio communication system intended to serve a linear route such as a railway track or road.

I claim:

1. A telecommunication system of the kind in which signals can be transmitted from a base transmitter station to a mobile station and signals from the mobile station can be transmitted to the base receiver station through a radiating transmission line, comprising a pair of radiating transmission lines extending substantially parallel to each other, one of the lines being connected to a base transmitter station and the other of the lines being connected to a base receiver station, a plurality of uni-directional amplifier elements connected between the lines at spaced intervals, alternate ones of the amplifier elements being connected to conduct in the opposite direction to adjacent amplifier elements, and routing means connected in the transmission lines between connections of said amplifier elements for routing signals along the lines alternately whereby a signal originating from said base transmitter station or a mobile station in the vicinity of said transmission line is routed to travel along part of a first of the lines and then through a part of the second of the lines with the transfer between the lines being effected through one of the amplifier elements.

2. A telecommunication system as claimed in claim 1, wherein the signals from the base transmitter are arranged to be transmitted at a frequency substantially different from the frequency of signals transmitted by a mobile station.

3. A telecommunication system as claimed in claim 2, wherein the routing means comprises frequency filters of two types, one type being designed to pass signals of a first frequency while attenuating signals of a second frequency and the other being designed to pass signals of the second frequency while attenuating signals of the first frequency.

4. A telecommunication system as claimed in claim 1, wherein the routing means comprises a radio frequency switch, the switches in alternate parts of the line being arranged to be opened and closed alternately.

5. A telecommunications system as claimed in claim 4, wherein the frequency of operation of the switches is above the modulation frequency of the transmitter.

* * * * *